US009627690B2

(12) United States Patent
Kim et al.

(10) Patent No.: US 9,627,690 B2
(45) Date of Patent: Apr. 18, 2017

(54) POSITIVE ELECTRODE COMPOSITION FOR RECHARGEABLE LITHIUM BATTERY, AND POSITIVE ELECTRODE FOR RECHARGEABLE LITHIUM BATTERY AND RECHARGEABLE LITHIUM BATTERY INCLUDING THE SAME (71) Applicant: SAMSUNG SDI CO., LTD., Yongin-si, Gyeonggi-do (KR)

(72) Inventors: In Kim, Yongin-si (KR); Eun-Jung Kim, Yongin-si (KR); Sang-Woon Yang, Yongin-si (KR); Young-Eun Kim, Yongin-si (KR); Jae-Kyung Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 14/726,236

(22) Filed: May 29, 2015

(65) Prior Publication Data
US 2016/0043403 A1   Feb. 11, 2016

(30) Foreign Application Priority Data
Aug. 5, 2014   (KR) .................... 10-2014-0100542

(51) Int. Cl.
*H01M 4/131*   (2010.01)
*H01M 4/136*   (2010.01)
(Continued)

(52) U.S. Cl.
CPC ............. *H01M 4/625* (2013.01); *H01M 4/13* (2013.01); *H01M 4/131* (2013.01); *H01M 4/136* (2013.01);
(Continued)

(58) Field of Classification Search
CPC ........ H01M 4/13; H01M 4/131; H01M 4/136; H01M 4/505; H01M 4/525; H01M 4/5825;
(Continued)

(56) References Cited

U.S. PATENT DOCUMENTS

| 2013/0302693 A1 | 11/2013 | Sun et al. | |
| 2013/0323585 A1* | 12/2013 | Inoue | H01G 11/68 429/211 |
| 2014/0295068 A1* | 10/2014 | Nanba | H01M 4/0404 427/122 |

FOREIGN PATENT DOCUMENTS

| EP | 2 325 138 A2 | 5/2011 |
| JP | 2002-198034 A | 7/2002 |

(Continued)

OTHER PUBLICATIONS

EPO Search Report dated Jan. 5, 2016, for corresponding European Patent application 15158352.3, (7 pages).
(Continued)

*Primary Examiner* — Brittany Raymond
(74) *Attorney, Agent, or Firm* — Lewis Roca Rothgerber Christie LLP (57) ABSTRACT A positive electrode composition for a rechargeable lithium battery includes a positive active material, a spherically shaped conductive material, and a sheet-shaped conductive material. The spherically shaped conductive material is included in an amount of about 1.1 to about 10 parts by weight based on 1 part by weight of the sheet-shaped conductive material. A positive electrode includes the positive electrode composition and a rechargeable lithium battery includes the positive electrode.

11 Claims, 2 Drawing Sheets (51) Int. Cl.
  *H01M 4/505* (2010.01)
  *H01M 4/525* (2010.01)
  *H01M 4/58* (2010.01)
  *H01M 4/62* (2006.01)
  *H01M 10/0525* (2010.01)
  *H01M 4/13* (2010.01)
  *H01M 4/02* (2006.01)

(52) U.S. Cl.
  CPC .......... *H01M 4/505* (2013.01); *H01M 4/525* (2013.01); *H01M 4/5825* (2013.01); *H01M 10/0525* (2013.01); *H01M 2004/028* (2013.01); *Y02T 10/7011* (2013.01)

(58) Field of Classification Search
  CPC ............. H01M 4/625; H01M 10/0525; H01M 2004/028
  See application file for complete search history.

(56) References Cited

FOREIGN PATENT DOCUMENTS

| | | |
|---|---|---|
| JP | 2003-257416 A | 9/2003 |
| KR | 2001-0092194 A | 10/2001 |
| KR | 10-2005-0048739 A | 5/2005 |

OTHER PUBLICATIONS

Denki Kagaku Kogyo K K: *Introduction of Denka Black*, Jan. 1, 2004, (20 pages), XP055206493, Retrieved from the Internet: URL:http://utsrus.com/index.php?page=shop.getfile&file_id=10768&product_id=5833option=com_virtuemart&Itemid=7 [retrieved on Aug. 5, 2015].

English machine translation of Japanese Publication No. JP 2002-198034 A, dated Jul. 12, 2002, 18 pages.

English machine translation of Japanese Publication No. JP 2003-257416 A, dated Sep. 12, 2003, 16 pages.

\* cited by examiner

POSITIVE ELECTRODE COMPOSITION FOR RECHARGEABLE LITHIUM BATTERY, AND POSITIVE ELECTRODE FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2014-0100542 filed in the Korean Intellectual Property Office on Aug. 5, 2014, the entire content of which is incorporated herein by reference.

BACKGROUND

1. Field

An embodiment of the present invention relates to a positive electrode composition for a rechargeable lithium battery, a positive electrode for a rechargeable lithium battery, and a rechargeable lithium battery including the same.

2. Description of the Related Art

A rechargeable lithium battery includes a positive electrode and a negative electrode, each respectively including a positive active material and negative active material that can reversibly intercalate/deintercalate lithium ions, and an organic electrolyte solution or a polymer electrolyte solution filled between the positive electrode and the negative electrode. The positive electrode and the negative electrode may intercalate and deintercalate lithium ions and produce electrical energy through oxidation and reduction reactions.

A positive active material for the rechargeable lithium battery may include, as a major component, an oxide consisting of lithium and a transition metal and having a structure capable of intercalating lithium. Examples of the positive active material include a lithium cobalt-based oxide, a lithium manganese-based oxide, a lithium nickel-based oxide, a lithium iron phosphate-based compound, and the like.

These positive active materials, which may have low electrical conductivity, are generally mixed with a conductive agent to prepare electrode slurry.

Accordingly, a high current density rechargeable lithium battery, that is, a rechargeable lithium battery having high energy density per unit volume, has been increasingly desired. As such, a method of improving cycle-life characteristics and rate capability at a low temperature and room temperature while securing safety of a rechargeable lithium battery and increasing current density of the rechargeable lithium battery may be desired. Such a rechargeable lithium battery may be used, for example, in an electric vehicle.

SUMMARY

Embodiments of the present invention are directed to a positive electrode composition for a rechargeable lithium battery having increased current density, improved cycle-life characteristics, improved rate capability at a low temperature and room temperature, improved safety, and/or lower manufacturing cost per energy density.

According to an embodiment, a positive electrode composition for a rechargeable lithium battery includes a positive active material; a sheet-shaped conductive material; and a spherically shaped conductive material, which is included in an amount of about 1.1 to about 10 parts by weight based on 1 part by weight of the sheet-shaped conductive material.

In some embodiments, the spherically shaped conductive material is included in an amount of about 1 to about 15 wt % by weight based on a total weight of the positive electrode composition.

In some embodiments, the sheet-shaped conductive material is included in an amount of about 0.1 to about 5 wt % by weight based on a total weight of the positive electrode composition.

In some embodiments, the spherically shaped conductive material comprises carbon black, acetylene black, a conductive aerogel, or a combination thereof.

In some embodiments, the spherically shaped conductive material has an average particle diameter of about 1 nm to about 500 nm.

In some embodiments, the sheet-shaped conductive material comprises sheet-shaped graphite, graphene, a flake-shaped carbon, or a combination thereof.

In some embodiments, the sheet-shaped conductive material has a long diameter of about 4 μm to about 7 μm.

In some embodiments, the positive active material includes a lithium manganese-based oxide, a lithium nickel-based oxide, a lithium cobalt-based oxide, a lithium nickel manganese-based oxide, a lithium nickel cobalt-based oxide, a lithium nickel cobalt manganese-based oxide, a lithium nickel cobalt aluminum-based oxide, a lithium iron phosphate-based compound, a lithium manganese phosphate-based compound, a lithium cobalt phosphate-based compound, a lithium vanadium phosphate-based compound, or a combination thereof.

According to another embodiment, a positive electrode includes the positive electrode composition according an embodiment of the present invention.

In some embodiments, the positive electrode has a loading level of about 33 to about 45 $mg/cm^2$.

According to a further embodiment, a rechargeable lithium battery includes the positive electrode according an embodiment of the present invention; a negative electrode; and an electrolyte solution.

In some embodiments, the rechargeable lithium battery has a current density of about 2 to about 8 $mA/cm^2$.

These and other embodiments of the present invention are described in more detail in the following detailed description.

The positive electrode composition for a rechargeable lithium battery may provide a rechargeable lithium battery with increased energy density per unit volume, improved cycle-life characteristics, improved rate capability at room temperature and a low temperature, improved safety, and/or may have a lower cost of manufacturing in relation to the energy density.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

In the following detailed description, only certain exemplary embodiments of the present invention are shown and described, by way of illustration. Embodiments are also described with reference to the accompanying drawings. Those skilled in the art would recognize that the described embodiments may be modified in different ways, and therefore should not be construed as limiting the scope of the present invention. As used herein, the term "and/or," used with a list of elements, includes any and all combinations of one or more of the elements on the list. Expressions such as "at least one of," when preceding a list of elements, modify the entire list of elements and do not modify the individual elements of the list. The use of the term "may" when describing embodiments of the present invention refers to "one or more embodiments of the present invention."

Also, in the context of the present application, when a first element is referred to as being "on" a second element, the first element may be directly on the second element or may be indirectly on the second element with one or more intervening elements interposed therebetween. Further, when a first element is described as being "coupled" or "connected" to a second element, the first element may be directly "coupled" or "connected" to the second element, or one or more other intervening elements may be located between the first element and the second element.

Additionally, as used herein, the terms "use," "using," and "used" may be considered synonymous with the terms "utilize," "utilizing," and "utilized," respectively.

Further, as used herein, terms such as "above" and "on" are used in a relative sense and, therefore, should not be construed as limiting, as an element that is above another element may instead be below the other element, depending upon the point of view.

As used herein, the term "substantially," "about," and similar terms are used as terms of approximation and not as terms of degree, and are intended to account for the inherent deviations in measured or calculated values that would be recognized by those of ordinary skill in the art.

A positive electrode composition for a rechargeable lithium battery according to one embodiment includes a positive active material, a spherically shaped conductive material and a sheet-shaped conductive material. In some embodiments, the spherically shaped conductive material is included in an amount of about 1 to about 10 parts by weight based on 1 part by weight of the sheet-shaped conductive material.

To provide a battery with a high energy density per unit volume, the current density of the battery may be increased. However, in order to increase the current density of a commonly used rechargeable lithium battery (e.g., a rechargeable lithium battery that uses a positive electrode composition made by mixing a positive active material, a spherically-shaped conductive material, a binder, and the like to prepare the positive electrode) a loading level of the positive electrode may be increased. However, in doing so, the positive electrode plate may crack, break, and/or bend. According to embodiments of the present invention, the positive electrode composition provides a positive electrode with improved cycle-life characteristics, improved rate capability at low temperatures and at room temperature, improved safety, and improved electrical conductivity. Additionally, in some embodiments, the positive electrode composition provides an improved binding force to a current collector, and may exhibit less swelling and higher energy density per unit volume compared to some commonly used positive electrode compositions.

The positive electrode composition according to one embodiment includes a positive active material, a spherically shaped conductive material and a sheet shaped conductive material, while some conventional positive electrode compositions include a positive active material and a spherically shaped conductive material.

According to an embodiment, a positive electrode includes the positive electrode composition. The positive electrode according to one embodiment shows an increase in effective electron movements, which may be due to an increased number of passages for electrons, which in turn, may improve rate capability at a low temperature. Compared to the positive electrode according some embodiments of the present invention, a commonly used positive electrode may have more ineffective electron movements. Additionally, the positive electrode according to some embodiments may show less increase in swelling with each charge cycle compared to some commonly used positive electrodes and thus may have an improved ability to maintain passages for effective electron movement compared to some commonly positive electrodes. Thus, according to some embodiments, the positive electrode may have improved cycle-life characteristics compared to a conventional positive electrode, which may show more swelling with each cycle and be less capable of maintaining passages for effective electron movement, thus may have deteriorating cycle-life characteristics. Specific experiment data are illustrated in the Examples section, particularly in Evaluation Example 1 and Evaluation Example 2.

The positive electrode composition according to one embodiment may be applied to a rechargeable lithium battery to manufacture a high current density battery. In some embodiments, the current density may be about 2 to about 8 mA/cm$^2$, about 2.4 to about 8 mA/cm$^2$, or about 2.4 to about 5 mA/cm$^2$. That is, the positive electrode composition may be used for a battery having current density of about 2 to about 8 mA/cm$^2$, about 2.4 to about 8 mA/cm$^2$, or about 2.4 to about 5 mA/cm$^2$.

In some embodiments, the positive electrode composition may increase the loading level of the positive electrode up to greater than or equal to about 33 mg/cm$^2$. That is, the positive electrode composition may be applied to a positive electrode to a loading level of greater than or equal to about 33 mg/cm$^2$, for example, to a loading level of about 33 to about 45 mg/cm$^2$.

The spherically shaped conductive material may be included in the positive electrode composition in an amount of about 1.1 to about 10 parts by weight, specifically about 1.1 to about 9 parts by weight, about 1.1 to about 8 parts by weight, about 1.1 to about 7 parts by weight, about 1.1 to about 6 parts by weight, or about 1.1 to about 5 parts by weight based on 1 part by weight of the sheet-shaped conductive material. In some embodiments, within these ranges, the positive electrode composition may increase electrical conductivity of a positive electrode including the positive electrode composition and may have improved adherence to the positive electrode. Further, a rechargeable lithium battery including the same may show increased current density, improved cycle-life characteristics, and the like.

The spherically shaped conductive material may be included in the positive electrode composition in an amount of about 1 to about 15 wt %, about 1 to about 10 wt %, about 1 to about 8 wt %, about 1 to about 6 wt %, or about 1 to about 5 wt % based on the total amount of the positive electrode composition. In some embodiments, within these ranges, the positive electrode composition may increase electrical conductivity of a positive electrode including the positive electrode composition and may have improved adherence to the positive electrode. Further, a rechargeable lithium battery including the same may have increased current density, improved cycle-life characteristics, and the like.

The sheet-shaped conductive material may be included in the positive active material composition in an amount of about 0.1 to about 5 wt %, about 0.1 to about 4 wt %, about 1 to about 5 wt %, or about 1 to about 4 wt % based on the total amount of the positive electrode composition. In some embodiments, within these ranges, the positive electrode composition may increase the electrical conductivity of a positive electrode including the positive electrode composition and may have improved adherence to the positive electrode. Further, a rechargeable lithium battery including the same may have increased current density, improved cycle-life characteristics, and the like.

Non-limiting examples of the spherically shaped conductive material include carbon black (e.g., KETJENBLACK® (available in various forms such as KETJENBLACK® EC-300J, KETJENBLACK® EC-600JD (pellets or powder), KETJENBLACK® EC-330 JMA from Akzo Nobel N.V.), an electro-conductive carbon mixed with plastics, rubbers and/or other materials, which may be more effective at lower loading quantities compared with some commonly used carbon blacks), acetylene black (e.g., DENKA BLACK® (available from DENKA® Elastomers & Acetylene Black), a highly purified and highly conductive acetylene black consisting of colloidal fine particles of carbon that are linked in the form of a chain having a high degree of graphitization), a conductive aerogel, and combinations thereof.

The spherically shaped conductive material may have an average particle diameter of about 1 nm to about 500 nm, about 1 nm to about 400 nm, about 1 nm to about 300 nm, about 1 nm to about 200 nm, about 1 nm to about 100 nm, or about 10 nm to about 100 nm. In some embodiments, within these ranges, the positive electrode composition may increase the electrical conductivity of a positive electrode including the positive electrode composition and may have improved adherence to the positive electrode. Further, a rechargeable lithium battery including the same may have increased current density, improved cycle-life characteristics, and the like.

Non-limiting examples of the sheet-shaped conductive material include sheet-shaped graphite, graphene, flake-shaped carbon, and combinations thereof.

The sheet-shaped conductive material may have a long diameter of about 4 μm to about 7 μm. In some embodiments, within this range, the positive electrode composition may increase electrical conductivity of a positive electrode including the positive electrode composition, improve adherence to the positive electrode, and/or may reduce the degree of swelling on (or of) a positive electrode with each charging cycle. Further, a rechargeable lithium battery including the same may have increased current density, improved cycle-life characteristics, and the like. As used herein, the long diameter refers to the longest diameter (or length) of a substantially flat side of the sheet-shaped conductive material.

The positive electrode composition for a rechargeable lithium battery may further include a binder. The binder may improve binding of each component in the positive electrode composition to each other and may improve the adherence of the positive electrode composition to an electrode plate.

The binder may include any suitable binder commonly used in rechargeable lithium batteries. Non-limiting examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, a nylon polymer, and a combination thereof.

The binder may be included in the positive electrode composition in an amount of about 1 to about 15 wt %, about 1 to about 10 wt %, or about 1 to about 8 wt % based on the total amount of the positive electrode composition for a rechargeable lithium battery.

In addition, the binder may be included in the positive electrode composition in an amount of about 0.5 to about 5 parts by weight, about 0.5 to about 4 parts by weight, about 0.5 to about 3 parts by weight, about 0.5 to about 2 parts by weight, or about 1 to about 2 parts by weight based on 1 part by weight of the spherically shaped conductive material. In some embodiments, within these ranges, the positive electrode composition may have an increased binding force and increased electrical conductivity.

The positive active material may be suitable positive active material that is commonly used in a rechargeable lithium battery. The positive active material may include a compound (e.g., a lithiated intercalation compound) capable of intercalating and deintercalating lithium. For example, the positive active material may be a composite oxide of lithium and a metal such as cobalt, manganese, nickel, or a combination thereof (e.g., a lithium metal oxide).

Non-limiting examples of the positive active material include a lithium manganese-based oxide, a lithium nickel-based oxide, a lithium cobalt-based oxide, a lithium nickel manganese-based oxide, a lithium nickel cobalt-based oxide, a lithium nickel cobalt manganese-based oxide, a lithium nickel cobalt aluminum-based oxide, a lithium iron phosphate-based compound, a lithium manganese phosphate-based compound, a lithium cobalt phosphate-based compound, a lithium vanadium phosphate-based compound, and combinations thereof.

Further non-limiting examples of the positive active material include compounds represented by the following chemical formulae: $Li_aA_{1-b}R_bD_2$ (wherein, in the above chemical formula, $0.90 \leq a \leq 1.8$ and $0 \leq b \leq 0.5$); $Li_aE_{1-b}R_bO_{2-c}D_c$ (wherein, in the above chemical formula, $0.90 \leq a \leq 1.8$, $0 \leq b \leq 0.5$ and $0 \leq c \leq 0.05$); $LiE_{2-b}R_bO_{4-c}D_c$ (wherein, in the above chemical formula, $0 \leq b \leq 0.5$, $0 \leq c \leq 0.05$); $Li_aNi_{1-b-c}Co_bR_cD_\alpha$ (wherein, in the above chemical formula, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, in the above chemical formula, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, in the above chemical formula, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, in the above chemical formula, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, in the above chemical formula, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, in the above chemical formula, $0.90 \leq a \leq 1.8$ and $0.001 \leq b \leq 0.1$); $Li_aCoG_bO_2$ (wherein, in the above chemical formula, $0.90 \leq a \leq 1.8$ and $0.001 \leq b \leq 0.1$); $Li_aMnG_bO_2$ (wherein, in the above chemical formula, $0.90 \leq a \leq 1.8$ and $0.001 \leq b \leq 0.1$); $Li_aMn_2G_bO_4$ (wherein, in the above chemical formula, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$, $LiFe_xMn_{1-x}$ (wherein, in the above chemical formula $0 \leq x < 1$); $LiMnPO_4$, $LiCoPO_4$, $Li_3V_2(PO_4)_3$, $LiFePO_4(OH)$, and $LiMnPO_4(OH)$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material compound may have a coating layer on the surface or may be mixed with another compound having a coating layer.

The coating layer may include a coating layer element. Non-limiting examples of the coating layer element include Mg, Al, Co, K, Na, Ca, Si, Ti, V, Sn, Ge, Ga, B, As, Zr, and mixtures and/or alloys thereof. The coating layer may include an oxide of the coating element, a hydroxide of the coating element, an oxyhydroxide of the coating element, an oxycarbonate of the coating element, and/or a hydroxy carbonate of the coating element. The positive active material compound or other compound for the coating layer may be amorphous or crystalline. The coating layer may be disposed on the positive active material compound by any suitable method that does not substantially affect the properties of the positive active material. Non-limiting examples of suitable coating methods may include spray coating, dipping, and other methods commonly used for coating active materials suitable for used in rechargeable lithium battery electrodes.

In another embodiment, a rechargeable lithium battery includes a positive electrode including the positive electrode composition according to embodiments described herein, a negative electrode, and an electrolyte solution.

The rechargeable lithium battery may include a positive electrode; a negative electrode; a separator between the positive electrode and the negative electrode; an electrolyte solution impregnated in the positive electrode, the negative electrode, and the separator; a battery case; and a sealing member sealing the battery case. The rechargeable lithium battery may be manufactured by sequentially stacking a negative electrode, a separator, and a positive electrode; spirally winding the resulting stack; and housing the resulting spirally-wound stack in a battery case.

The positive electrode includes a current collector and a positive active material layer formed on the current collector. The current collector for the positive electrode may be made of Al, but is not limited thereto.

The positive active material layer includes the positive electrode composition for a rechargeable lithium battery according to embodiments described herein.

The negative electrode includes a current collector and a negative active material layer formed on the current collector. Non-limiting examples of the current collector for the negative electrode include a copper foil, a nickel foil, a stainless steel foil, a titanium foil, a nickel foam, a copper foam, a polymer substrate coated with a conductive metal, and a combination thereof.

The negative active material layer may include a negative active material, a binder, and optionally a conductive material.

The negative active material may include a material that reversibly intercalates/deintercalates lithium ions, a lithium metal, a lithium metal alloy, a material that is capable of doping and dedoping lithium, and/or a transition metal oxide.

The material that reversibly intercalates/deintercalates lithium ions may be a carbon-based material, for example, any carbon-based negative active material commonly used in a rechargeable lithium battery. Non-limiting examples of the carbon-based material include crystalline carbon, amorphous carbon, and mixtures thereof. The crystalline carbon may be non-shaped, sheet-shaped, flake-shaped, spherical-shaped, and/or fiber-shaped and may be natural graphite and/or artificial graphite. The amorphous carbon may be a soft carbon, a hard carbon, a mesophase pitch carbonized product, fired coke, and/or the like.

Non-limiting examples of the lithium metal alloy include an alloy of lithium and a metal selected from Na, K, Rb, Cs, Fr, Be, Mg, Ca, Sr, Si, Sb, Pb, In, Zn, Ba, Ra, Ge, Al, and/or Sn.

Non-limiting examples of the material capable of doping and dedoping lithium include Si, $SiO_x$ ($0 < x < 2$), a Si—C composite, a Si-Q alloy (wherein Q is an alkali metal, an alkaline-earth metal, Group 13 to 16 elements excluding Si, a transition metal, a rare earth element, or a combination thereof), Sn, $SnO_2$, a Sn—C composite, Sn—R (wherein R is an alkali metal, an alkaline-earth metal, Group 13 to 16 elements excluding Sn, a transition metal, a rare earth element, or a combination thereof), and the like. Specific non-limiting examples of Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof. Non-limiting examples of the transition metal oxide include vanadium oxide, lithium vanadium oxide, and the like.

The binder of the negative active material layer may improve binding among the negative active material particles and may improve binding of the negative active material particles to the current collector. Non-limiting examples of the binder include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and the like.

The conductive material of the negative active material layer may improve conductivity of the negative electrode. Suitable electrically conductive materials include any conductive material that does not cause any substantial chemical change within the negative active material. Examples of suitable electrically conductive materials include conductive materials commonly used in rechargeable lithium batteries, such as a carbon-based material. Non-limiting examples of suitable carbon-based materials include natural graphite, artificial graphite, carbon black (e.g., KETJENBLACK®), acetylene black, carbon fiber and the like; a metal-based material such as a metal powder or a metal fiber and the like of copper, nickel, aluminum, silver, and the like; a conductive polymer such as a polyphenylene derivative, and the like; and mixtures thereof.

The negative electrode and the positive electrode may be manufactured by respectively mixing an active material, a conductive material, and a binder to prepare an active material composition and coating the composition on a current collector, for each electrode. Other suitable methods for preparing a negative electrode and/or a positive electrode may also be used, for example, methods that are commonly used to prepare electrodes for rechargeable lithium batteries.

The electrolyte solution for a rechargeable lithium battery according to embodiments of the present invention includes a non-aqueous organic solvent and a lithium salt.

The non-aqueous organic solvent may serve as a medium for the transmission of ions to facilitate an electrochemical reaction within the rechargeable lithium battery.

Non-limiting examples of the non-aqueous organic solvent include a carbonate-based solvent, an ester-based solvent, an ether-based solvent, a ketone-based solvent, an alcohol-based solvent, and an aprotic solvent. Non-limiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Non-limiting examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, and the like. Non-limiting examples of the ether-based solvent include dibutylether, tetraglyme, diglyme, dimethoxyethane, 2-methyltetrahydrofuran, tetrahydrofuran, and the like. Non-limiting examples of the ketone-based solvent include cyclohexanone and the like. Non-limiting examples of the alcohol-based solvent include ethanol, isopropyl alcohol, and the like. Non-limiting examples of the aprotic solvent include nitriles such as R—CN (wherein R is a C2 to C20 linear, branched, or cyclic hydrocarbon group, which may include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be set in accordance with a desirable battery performance.

In some embodiments, the carbonate-based solvent is prepared by mixing a cyclic carbonate and a linear carbonate. In some embodiments, the cyclic carbonate and the linear carbonate are mixed together in the volume ratio of about 1:1 to about 1:9. In some embodiments, within this range, performance of electrolyte may be improved.

In some embodiments, the non-aqueous organic solvent of the present invention includes an aromatic hydrocarbon-based organic solvent as well as the carbonate based solvent. In some embodiments, the carbonate-based and the aromatic hydrocarbon-based solvents may be mixed together in a volume ratio of about 1:1 to about 30:1.

Non limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The non-aqueous organic solvent may further include vinylene carbonate. In some embodiments, the cycle-life of a rechargeable lithium battery may be improved by including vinylene carbonate in the non-aqueous organic solvent. The amount of the vinylene carbonate may be set to any range suitable to improve cycle life.

Non-limiting examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate and fluoroethylene carbonate.

In some embodiments, the lithium salt (or supporting salt) is dissolved in the non-aqueous organic solvent and supplies the lithium ions that a rechargeable lithium battery uses to operate and may also improve lithium ion transfer between positive and negative electrodes. In some embodiments, the lithium salt includes at least one supporting salt. Non-limiting examples of the lithium salt (or supporting salt) include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are non-zero natural numbers, LiCl, LiI, $LiB(C_2O_4)_2$ (lithium bis(oxalato)borate, LiBOB), and combinations thereof. The lithium salt may be used in a concentration of about 0.1 to about 2.0M. When the lithium salt is included in the above concentration range, an electrolyte may have improved performance and lithium ion mobility, which may be due to suitable electrolyte conductivity and suitable electrolyte viscosity.

A separator may be present between the positive electrode and a negative electrode depending on the specific structure of the rechargeable lithium battery. The separator may include one or more layers of polyethylene, polypropylene, polyvinylidene fluoride, for example, a polyethylene/polypropylene double-layered separator, a polyethylene/polypropylene/polyethylene triple-layered separator, a polypropylene/polyethylene/polypropylene triple-layered separator, or the like.

Further embodiments of the present invention include power plants (or components thereof), driving gears, and transportation means (or components thereof) manufactured by with the rechargeable lithium battery according to embodiments described herein.

The rechargeable lithium battery according to embodiments of the present invention may have improved cycle-life characteristics, output characteristics, and safety. Further, the rechargeable lithium battery according to embodiments of the present invention may have a high energy per volume unit and thus, may be suitable for applications that may benefit from a high current density power source, for example, in power plants (or components thereof), driving gears, transportation (or components thereof), and the like.

Non-limiting examples of the transportation means include an automobile, a motorized bike, an electric vehicle, and the like.

Hereinafter, embodiments of the present invention are described by reference to the following Examples. However, these Examples are presented for illustrative purposes only and do not limit the scope of the present invention.

EXAMPLES 1 TO 3

Manufacture of Three Positive Electrodes 93 wt % of $LiNi_{1/3}Co_{1/3}Mn_{1/3}O_2$ (NCM) as a positive active material, 3 wt % of carbon black as a spherically-shaped conductive material, and 1 wt % of flake-type carbon (TIMCAL TIMEREX® SFG6 (available from Timcal Graphite and Carbon), a synthetic flake graphite with an anisometric particle shape and having relatively low specific surface area and high electrical conductivity compared to some other commonly used synthetic graphites) as the sheet-shaped conductive material, and 3 wt % of polyvinylidene fluoride (PVdF) as a binder are put in N-methylpyrrolidone (NMP) as a solvent and then, mixed therewith. The obtained positive electrode composition is coated on an aluminum substrate and then, compressed.

For each positive electrode (corresponding to Examples 1 to 3, respectively) current density, the number of jelly-roll turns, and a loading level are set as shown in the following Table 1.

Figure 1:
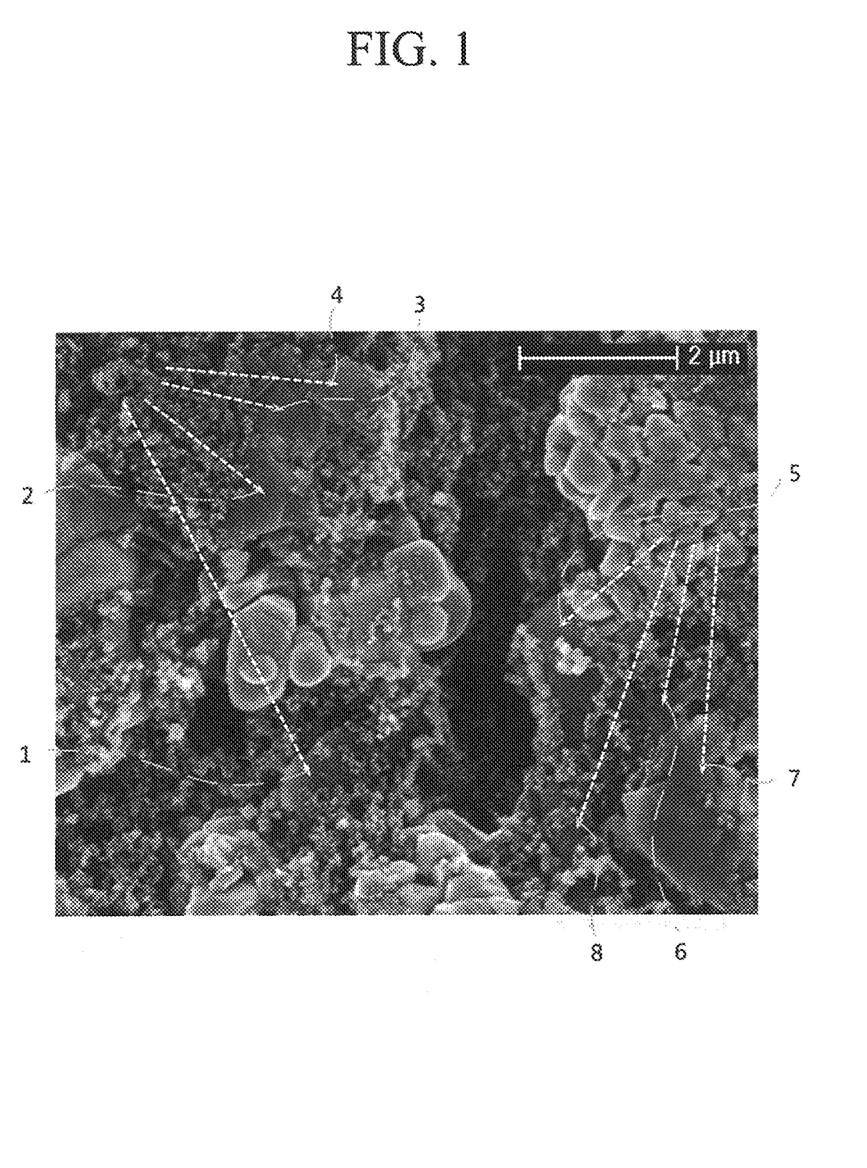
FIG. 1 is a scanning electron microscope (SEM) image showing the positive electrode according to Example 1.

FIG. 1 is a scanning electron microscope (SEM) image showing the positive electrode according to Example 1. In FIG. 1, examples of sheet-shaped portions of the conductive material are indicated with reference numerals 1 to 8.

COMPARATIVE EXAMPLE 1

Manufacture of Positive Electrode

A positive electrode are manufactured according to the same method as Examples 1 to 3 except that 94 wt % of a positive active material, 3 wt % of a spherically-shaped conductive material and 3 wt % of a binder are used in the positive active material composition and no sheet-shaped conductive material is included.

The current density, the number of jelly-roll turns, and the loading level of the positive electrode are set as shown in Table 1.

The following Table 1 provides the composition and evaluation of the positive electrodes according to Comparative Example 1 and Examples 1 to 3.

Manufacture of Four Rechargeable Lithium Battery Cells

The positive electrodes of Examples 1 to 3 and Comparative Example 1, respectively; a counter electrode obtained by coating graphite on a copper substrate; a polypropylene separator; and an electrolyte solution obtained by preparing a mixed solvent including ethylene carbonate (EC):dimethyl carbonate (DMC):methylethyl carbonate (MEC) in a volume ratio of 1:1:1 and adding 1 mol/L $LiPF_6$ to the mixed solvent, is used to manufacture a rechargeable lithium battery cell.

EVALUATION EXAMPLE 1

Properties of Positive Electrode

The binding force, specific resistance and electrode plate quality of the positive electrodes of Comparative Example 1 and Examples 1 to 3 is evaluated after the drying. The results are provided in Table 1.

The binding force between a positive active material layer and a current collector is obtained by measuring the tensile strength between the positive active material layer and the current collector. The specific resistance is calculated based on the resistance, which is measured using conductivity electrodes.

Referring to Table 1, Example 1 and 2 showed an increased binding force after the drying compared with Comparative Example 1. Accordingly, the loading level of the positive electrode may be increased to provide a higher current density.

In addition, Examples 1 to 3 showed decreased specific resistance after drying compared with Comparative Example 1. Accordingly, embodiments of the present inven-

TABLE 1

| | | Comparative Example 1 | Example 1 | Example 2 | Example 3 |
|---|---|---|---|---|---|
| Current density (mA/cm$^2$) | | 2.50 | 2.47 | 2.67 | 2.88 |
| Number of jelly-roll turns | | 16 | 16 | 15 | 14 |
| Positive electrode loading level (mg/cm$^2$) | | 34.8 | 34.7 | 37.05 | 40.53 |
| Positive active material | | NCM | NCM | NCM | NCM |
| Positive electrode composition | Positive active material (wt %) | 94 | 93 | 93 | 93 |
| | Conductive material (wt %) | spherically-shaped conductive material 3 | spherically-shaped conductive material 3 sheet-shaped conductive material 1 | spherically-shaped conductive material 3 sheet-shaped conductive material 1 | spherically-shaped conductive material 3 sheet-shaped conductive material 1 |
| | Binder (wt %) | 3 | 3 | 3 | 3 |
| Positive electrode Evaluation | Binding force after drying (gf/mm) | 1.6 | 1.9 | 1.8 | 1.1 |
| | Specific resistance after drying (mΩ) | 19 | 8.8 | 7.9 | 5.7 |
| | Electrode plate quality | 1) Electrode plate was cracked and broken during assembly 2) Electrode plate was severely bent | 1) Electrode plate was not broken 2) Electrode plate was slightly bent | 1) Electrode plate was not broken 2) Electrode plate was slightly bent | 1) Electrode plate was not broken 2) Electrode plate was slightly bent | tion may improve cycle-life characteristics and rate capability at a low temperature and room temperature.

Examples 1 to 3 did not result in broken electrode plates and showed a small or negligible degree of bending of the electrode plates. On the other hand, comparative Example 1 showed a cracked, broken, or severely bent electrode plate. Thus Examples 1 to 3 according to embodiments of the present invention maintained improved quality in comparison to Comparative Example 1.

EVALUATION EXAMPLE 2

Cycle-Life Characteristics of Battery Cell

Figure 2:
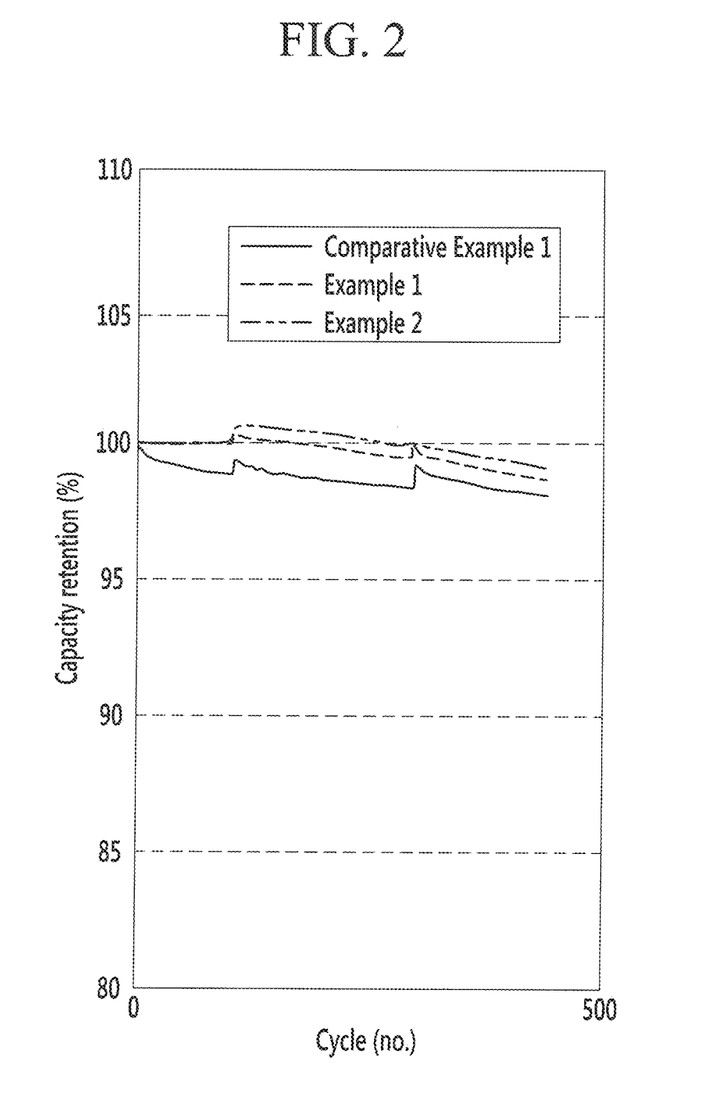
FIG. 2 is a graph showing cycle-life characteristics of the rechargeable lithium battery cells measured for Example 1, Example 2, and Comparative Example 1.

Cycle-life characteristics of the cells according to Examples 1 and 2 and Comparative Example 1 were evaluated at 25° C. under a condition of 1 C/1 C, and the results are provided in FIG. 2.

FIG. 2 is a graph showing cycle-life characteristics of the rechargeable lithium battery cells according to Examples 1 and 2 and Comparative Example 1. Referring to the graph of FIG. 2, the rechargeable lithium battery cells according Examples 1 and 2 showed improved cycle-life characteristics compared to the rechargeable lithium battery cell according to Comparative Example 1.

While the present invention has been described in connection with certain exemplary embodiments, those of ordinary skill in the art will understand that various modifications may be made to the disclosed embodiments without departing from the spirit and scope of the appended claims, and equivalents thereof.

What is claimed is:
1. A positive electrode composition for a rechargeable lithium battery, comprising:
 a positive active material;
 a sheet-shaped conductive material; and
 a spherically shaped conductive material, which is included in an amount of about 1.1 to about 10 parts by weight based on 1 part by weight of the sheet-shaped conductive material,
  wherein the sheet-shaped conductive material comprises sheet-shaped graphite, a flake-shaped carbon, or combination thereof, and
  wherein the spherically shaped conductive material comprises carbon black, a conductive aerogel, or a combination thereof.

2. The positive electrode composition of claim 1, wherein the spherically shaped conductive material is included in an amount of about 1 to about 15wt % by weight based on a total weight of the positive electrode composition.

3. The positive electrode composition of claim 1, wherein the sheet-shaped conductive material is included in an amount of about 0.1 to about 5 wt % by weight based on a total weight of the positive electrode composition.

4. The positive electrode composition of claim 1, wherein the spherically shaped conductive material has an average particle diameter of about 1 nm to about 500 nm.

5. The positive electrode composition of claim 1, wherein the sheet-shaped conductive material has a long diameter of about 4 μm to about 7 μm.

6. The positive electrode composition of claim 1, wherein the positive electrode composition further comprises a binder.

7. The positive electrode composition of claim 1, wherein the positive active material comprises a lithium manganese-based oxide, a lithium nickel-based oxide, a lithium cobalt-based oxide, a lithium nickel manganese-based oxide, a lithium nickel cobalt-based oxide, a lithium nickel cobalt manganese-based oxide, a lithium nickel cobalt aluminum-based oxide, a lithium iron phosphate-based compound, a lithium manganese phosphate-based compound, a lithium cobalt phosphate-based compound, a lithium vanadium phosphate-based compound, or a combination thereof.

8. A positive electrode for a rechargeable lithium battery, comprising the positive electrode composition of claim 1.

9. The positive electrode of claim 8, wherein the positive electrode has a loading level of about 33 to about 45 mg/cm$^2$.

10. A rechargeable lithium battery, comprising
 the positive electrode of claim 8;
 a negative electrode; and
 an electrolyte solution.

11. The rechargeable lithium battery of claim 10, wherein the rechargeable lithium battery has a current density of about 2 to about 8 mA/cm$^2$.

* * * * *